May 13, 1969 T. A. DUNN 3,444,309
UNITIZED ASSEMBLY PLASTIC ENCAPSULATION PROVIDING
OUTWARDLY FACING NONPLASTIC SURFACES
Filed Dec. 26, 1967

INVENTOR.
THOMAS A. DUNN
BY
Mueller, Aichele & Rauner
ATTORNEYS

United States Patent Office 3,444,309
Patented May 13, 1969

3,444,309

UNITIZED ASSEMBLY PLASTIC ENCAPSULATION PROVIDING OUTWARDLY FACING NONPLASTIC SURFACES

Thomas A. Dunn, Mesa, Ariz., assignor to Motorola, Inc., Franklin Park, Ill., a corporation of Illinois Filed Dec. 26, 1967, Ser. No. 693,611
Int. Cl. H05k 5/02
U.S. Cl. 174—52 12 Claims

ABSTRACT OF THE DISCLOSURE

An electrical assembly having a plurality of upstanding tubular members with predetermined peripheral deformations. During molding operations, the tubular members are further deformed by pressures between two facing die parts such that tolerance of the thickness of the final assembly is less than the sum of the tolerances of the individual parts. The tubular members have radially extending surfaces forming electrical contacts along one surface of the assembly. Another metal plate attached to the tubular members forms substantially the opposite surface for providing a good heat sink connection. The tubular members are spaced peripherally of the metal plate such that mold pressures are evenly applied along the plate for preventing plastic encapsulating material from seeping over the plate. Portions of the plate may extend outwardly from the tubular members with the provision of a rigidizing and apertured deformation in the base plate for preventing flexure of the plate in a mold. The apertures in the rigidizing member permit plastic flow for solidly locking the plastic encapsulating material to the base plate. Plastic encapsulating material is provided inside the tubular members by runners in other parts of the electronic assembly.

*Background of the invention*

This invention relates to unitized electronic assemblies and particularly to those assemblies having plastic encapsulation material.

It has been found that the plastic encapsulation of semiconductor devices and their assemblies substantially reduces the cost of the final assembly. The plastic encapsulating materials presently being used are thermally insulating as well as electrically insulating. Therefore, semiconductor assemblies having high heat dissipation rates tend to generate high internal temperatures which may be destructive to semiconductor device electrical properties. In plastic encapsulated semiconductor devices good thermal paths for dissipating internally generated heat are, therefore, highly desirable.

In those electronic assemblies having a plurality of different parts, the cumulative tolerances of the individual parts along a given dimension may be much greater than tolerances desired for a final assembly. To manufacture individual parts to a very small tolerance greatly increases the cost of individual piece parts, reducing or eliminating the economic advantage of plastic encapsulating an assembly of such parts.

In many electrical or electronic assemblies, it is desirable to have surface type electrical contacts. This requirement means that conductive surfaces must be made substantially parallel to outer surfaces of the plastic encapsulating material. In many instances, for facilitating assembly of connecting wires, such electrical conductive surfaces are relatively large. For example, an annular contact may have an outside diameter of ⅜ of an inch, and an internal diameter of $\frac{3}{16}$ of an inch for accommodating a bolt or screw with a washer and a clip for attachment to a wire. Such requirements are exemplified in automotive electrical systems.

As indicated above, those assemblies having high heat generation rates require the dissipation of such heat. One manner of heat dissipation is to provide a relatively large area type of thermal path. Such a large area thermal path may be formed by clamping a large thermally conductive plate against a good heat sink, such as the chassis or body of an automobile. In such instance, large electrical contact areas are then provided on the opposite surface such as to make the electrical contacts readily accessible to an installer or repairman and not electrically short to the supporting member. When fabricating such a device, it is important that the plastic encapsulating material not cover either the large area thermal path nor the oppositely facing electrical contact areas.

*Summary of the invention*

It is an object of the present invention to provide a unitized plastic encapsulated assembly having parallel large nonplastic areas on oppositely facing surfaces.

It is another feature of the present invention to provide large nonplastic surfaces on opposite facing surfaces of a plastic encapsulated electronic assembly.

It is another feature of the invention that collapsible tubular members are provided in the unitized assembly which provide some of the large nonplastic surfaces and are supported on a metal plate which provides an oppositely facing nonplastic surface. The members serve to hold the metal plate against a die part during the molding operation for the prevention of plastic encapsulating material from creeping across the large area.

Another feature of the invention is a provision of peripheral deformation control surfaces in each of the tubular members for predetermining the location and extent of deformation of the tubular members during molding operation. By making the members deformable, the tolerances of the various parts in the assembly are greatly increased.

Another feature is the provision within the various mold parts of plastic mold runners for facilitating the plastic encapsulating material to flow inside the various tubular members for equalizing pressure on both sides of the members and for locking the plastic encapsulating material to the various parts of the assembly.

Another feature is the provision of rigidizing and plastic locking deformation in the bottom base plate for permitting a surface nonplastic area larger than the spacing between the various upstanding tubular members. In the above-described manner, the various tubular members are made selectively collapsible for permitting the mold parts to determine a dimension of the assembly and to have the mold parts determine the spacing between the oppositely-facing large-surface areas of the various tubular members and the base plate.

A plastic encapsulating method comprises the placing of an assembled electronic unit in a mold cavity, and then closing the mold cavity against a plurality of deformable or collapsible upright members for determining the thickness of the unit as well as providing oppositely facing large nonplastic surface areas in the unitized assembly. The strength of the various tubular members is somewhat less than the mold pressure with the lateral surfaces of the tubular members having a strength greater than the mold pressure. The provision of molding plastic encapsulating material inside and outside the tubular member equalizes any effect the pressures may have on deforming such member other than that caused in a predetermined manner by closing opposing die parts on the assembly.

In one embodiment of the invention there is provided a base plate of aluminum having an anodized surface. A portion of the anodized surface forms a heat sink connection for the final assembly. A plurality of apertures are provided in the anodized base plate for receiving bolts which hold the electrical assembly. A conductive metal base plate or member is disposed over one portion of the anodized base plate and has a plurality of apertures for receiving the holding bolts. Mold runners to the apertures are formed between the facing surfaces of the base plates. An insulating layer is provided across a portion of the conductive base plate for receiving a lead frame in insulating relationship thereto. The anodized base plate has a deformation in the area remote from the conductive base plate for ensuring that the anodized base plate does not flex during molding operation such that plastic encapsulating material seeps over the heat sink surface. A lead frame having a plurality of upstanding tubular members is disposed over the conductive base plate with the tubular members aligned with the apertures in the base plates. The tubular members have a lateral or radially extending surface on their upper portion for forming a plurality of electrical connections to the lead frame. Semiconductor devices are placed on the lead frame or on the conductive member with wire bonds being between various portions of the lead frame and respective devices for completing an electrical circuit. The lead frame may provide a plurality of terminals which extend out of the assembly in addition to the plurality of electrical connections flush with one surface. Plastic encapsulating material surrounds all of the parts except the one surface of the base plate, the extending terminals and the plurality of electrical connecting surfaces of the tubular members.

The tubular members are characterized in that they have peripheral deformations resulting from mold pressures collapsing the respective members such that the spacing between the electrical connections and the heat sink surfaces is determined during the molding operation. The rigidizing portion of the anodized base plate is apertured for permitting plastic flow for locking the plastic encapsulating material to the base plate. For facilitating assembly, the rigidizing portion may serve as a stop member for the conductive base plate. Also, upstanding flanges are provided on the anodized base plate for holding the conductive base plate in place prior to plastic encapsulation.

*The drawing*

*Detailed description of the illustrative embodiment*

Figure 1:
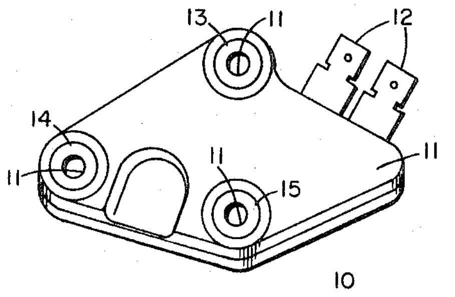
FIGS. 1 and 2 are perspective views of a plastic encapsulated assembly utilizing the present invention respectively showing the electrical connections portion and the large area thermal path portions on oppositely facing outer surfaces of the plastic encapsulated assembly.

Referring now more particularly to the drawing, like numbers indicate like parts and structural features in the various views. In a constructed embodiment, plastic encapsulated assembly 10 shown in FIGS. 1 and 2 has the corner-to-corner dimensions of 1¾ inch by 2¾ inch with a ⅜ inch thickness. The assembly 10 includes plastic encapsulating material 11 enclosing a later-described assemblage of electrical and mechanical parts. A pair of terminals 12 extend laterally from one edge for making two electrical connections (not shown). Further electrical connections are provided by annular metal surfaces 13, 14, and 15. Surfaces 13, 14, and 15 are raised slightly above plastic encapsulating material 11; alternately the surfaces may be depressed or made flush with material 11. The bottom side of the assembly 10 has a large anodized heat-dissipating surface 16 (FIG. 2) with enclosed plastic encapsulating material surface 17. Plastic encapsulating material forming surface 17 locks the plastic encapsulating material 11 to a metal base plate of which surface 16 is a part. Plastic encapsulating material 11 is also inside the apertures formed by the annular metal surfaces 13, 14, and 15 for providing electrical insulation between mounting bolts (not shown) and the respective annular metal surfaces.

Figure 2:
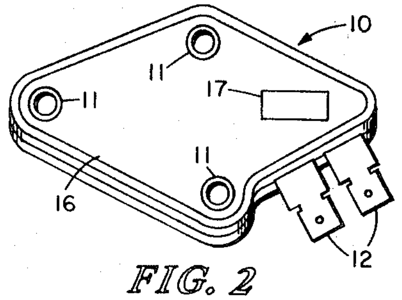
Figure 3:
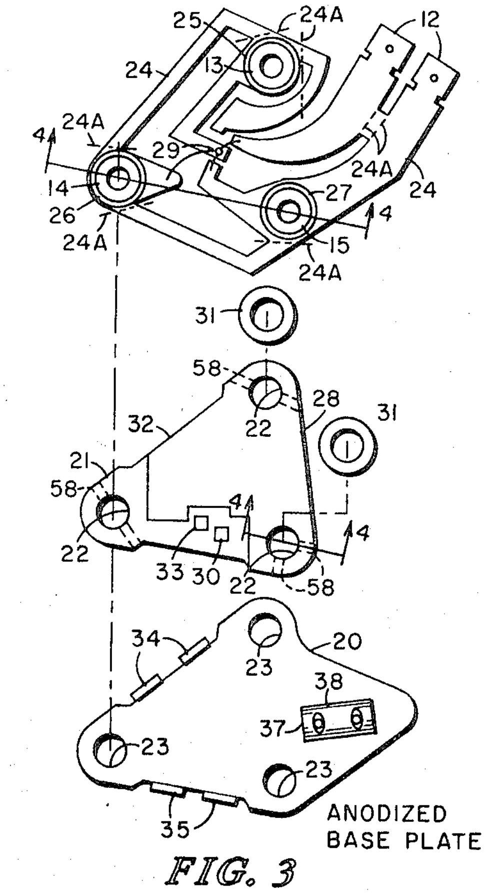
FIG. 3 is an exploded plan view of an assemblage of electrical and mechanical components to be plastic encapsulated and being inside the encapsulated assembly shown in FIGS. 1 and 2.

Referring next to FIG. 3, the assemblage of electrical and mechanical parts of assembly 10 are shown in exploded view with each part being shown in plan view form. This assemblage forms an electrical circuit means. Base plate 20 has an anodized surface of relatively thin anodization such that a heat barrier is not provided. Surface 16 of FIG. 2 forms the underside (not shown in FIG. 3) of anodized base plate 20. Triangular-shaped conductive base plate 21 is adapted to fit snugly onto anodized base plate 20. The three apertures 22 in plate 21 align with apertures 23 of anodized base plate 20. Lead frame 24, having three upstanding tubular members 25, 26, and 27, sets onto conductive base plate 21 with the apertures in the tubular members aligning with apertures 22. To provide a plurality of different electrical connections, this frame is severed at dotted lines 24A prior to encapsulation. The upper surfaces 13, 14, and 15 of the tubular members 25, 26, and 27, respectively, are the three conductive annular surfaces shown in FIG. 1. Tubular members 25, 26, and 27 may be welded, soldered, or otherwise affixed to lead frame 24. In the alternative, tubular member 26 may be attached directly to the conductive base plate 21 coaxially with aperture 22. Conductive base plate 21 has insulating layer 28 disposed thereon. Layer 28 consists of a plastic layer with adhesive material on both sides. When lead frame 24 is disposed on plate 21, the adhesive on the surfaces of layer 28 attach lead frame 24 to conductive base plate 21. Such adhesive attachment facilitates handling the assemblage of FIG. 3 as a unit, and also provides electrical isolation between lead frame 24 and conductive base plate 21. Semiconductor die 29 is bonded to lead frame 24, as shown, and electrically connected to other portions by wire leads 29A. A plurality of semiconductor dice 30 are similarly bonded to plate 21. After affixing lead frame 24 to plate 21, the dice 29 and 30 are wire bonded to the various portions of the lead frame for completing an electrical circuit in the assemblage. Dice 30, bonded directly on conductive base plate 21, may be semiconductor dice having high heat dissipation. Plate 21, having good thermal characteristics, such as a copper alloy, rapidly conducts heat away from dice 30. Plate 21, having a large contact with plate 20, which, in turn, has a large contact area with a supporting member having good thermal characteristics (not shown), provides rapid heat dissipation from the dice 30 for maintaining their temperature at a reasonable level. In this thermal path, it is important that minimal heat barriers are introduced. For this reason, when it is desired to electrically insulate base plate 20 from a support, the anodizing of base plate 20 must be kept thin. If plate 21 is kept at a reference potential equal to the support plate, then the anodizing of plate 20 may be dispensed with. In some assemblies it is desirable that the electrical potential of plate 21, and thereby the substrates semiconductor dice 30, be kept at a potential different than the potential of the supporting member. It has been found that the anodization of plate 20 does not substantially interfere with the thermal conductivity of the plates 20 and 21, especially when a large heat sink area is provided such as shown in FIG. 2 for surface 16.

Figure 7:
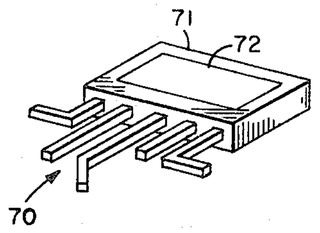
FIG. 7 is a perspective view of a plastic encapsulated electronic subassembly which may be included in the FIGS. 1 and 2 illustrated assembly.

While uncased semiconductor dice 29 and 30 are illustrated, no limitation thereto is intended. For example, lead frame 24, or a different form of lead frame (the form not being critical), may be partially encased with selected semiconductor dice. Referring to FIG. 7, such a subassembly is shown. Lead frame 70 is partially encased by plastic encapsulating material 71. Semiconductor dice (not shown, inside material 71) are bonded to heat sink portion 72. Portion 72 may be integrally formed with lead frame 70. The subassembly shown in FIG. 7 is mounted such that heat sink portion 72 is in good thermal contact with conductive base plate 21. Lead frame 70 can be made heavier than lead frame 24, such that later described pressure exerted on surfaces 13, 14, and 15 (tubular members 25, 26, and 27 being mounted on frame 70) is sufficient to prevent plastic encapsulating material 11 from moving between heat sink portion 71 and conductive base plate 21. Heat sink portion 71 may also be soldered or otherwise bonded to conductive base plate 21. Additionally, dice 30 (FIG. 3) may still be mounted directly on conductive base plate 21. Further, the FIG. 7 illustrated assembly may be disposed directly on anodized base plate 20 in the same manner as referred to with respect to conductive base plate 21 with the anodization providing electrical insulation between frame 71 and base plate 20. In the latter situation, all dice should be encased prior to being mounted in the FIG. 3 illustrated assemblage.

Mica washers 31 are coaxially disposed over the two apertures 22 directly beneath tubular members 25 and 27. Mica washers 31 are resistant to puncture from pressure used to plastic encapsulate the assemblage of FIG. 3, as later described. For example, layer 28, when formed of double adhesive plastic layer, is subject to penetration under molding pressures. In the alternative, layer 28 may be formed of a thin mica layer having adhesive on both sides, a ceramic layer suitably affixed to plate 21, the elmination of plate 21 with direct support on anodized plate 20, or any other form of insulating base for supporting lead frame 24 and electrically insulating it from conductive base plate 21 for forming an electrical circuit.

Continuing with the illustrated assemblage, recessed edges 32 and 33 of plate 21 are disposed in contact with upstanding flanges 34 and 35 of plate 23, respectively. Edge 36 of plate 21 abuts against edge 37 of plastic encapsulation locking and rigidizing portion 38. When so placed, base plates 20 and 21 are locked against sliding apart for easy handling prior to insertion in a plastic encapsulating mold machine. To facilitate placing base plate 21 on base plate 20, the fit of conductive base plate between flanges 34, 35, and edge 36 is quite loose; for example, relative slippage of 1/32 inch may be acceptable. To accommodate such relative motion and as best seen in FIG. 4, the radii of apertures 23 may be greater than the radii of apertures 22.

Figure 4:
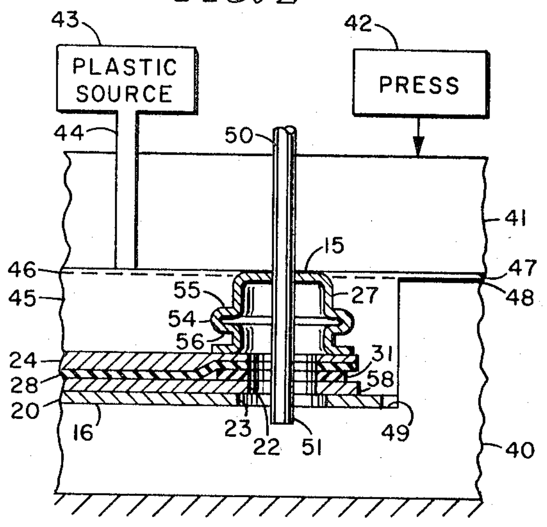
FIG. 4 is a diagrammatic showing of a portion of an injection or transfer mold utilized in fabricating the FIG. 1 and FIG. 2 illustrated assembly, together with a showing of a tubular member with initial peripheral deformation.

Still referring to FIG. 4, there is shown in diagrammatic form a portion of the assembled components of FIG. 3 disposed inside a plastic encapsulating mold. Since plastic encapsulating molds are well known, the machine is illustrated in diagrammatic form for simplifying the presentation of the invention. The mold machine has a stationary die part 40 for receiving the components of FIG. 3 as shown. The die part 40 may have locating pins to ensure proper location of the electronic assembly. Facing and movable die part 41 moves toward and away from stationary die part 40 under the control of press 42. Coordinated with the operation of press 42 is plastic source 43 selectively supplying plastic encapsulating material through mold runner or conduit 44 to mold cavity 45 formed between die parts 40 and 41 when die part 41 has been moved such that its face 47 has reached dotted line 46 and has formed a plastic sealing contact with opposed die face 48 of die part 40. Cavity 45 lies between lower surface 49 of part 40 on which the electronic assemblage of FIG. 3 is disposed and the facing die part face 47. Aperture-forming pin 50 movably extends through die part 41 thence through aperture 22 and tubular member 27 into recess 51 of stationary die part 40. A similar aperture forming pin is disposed through the other two apertures 22, not shown in FIG. 4. Tubular member 27 initially extends above line 46. When movable die part 41 is forced against surface 48, tubular member 27 is collapsed or further deformed by the movement of die part 41. This action determines the spacing between surface 16 and the surfaces 13, 14, and 15 irrespective of loose tolerances of the parts illustrated in FIG. 3.

As movable die part 41 closes onto stationary die part 40, surface 15 is pushed toward die surface or face 49 crumpling the tubular portion of member 27. Without the radially outwardly extending bulge or deformed segment 54, it is unpredictable where member 27 would deform. In some instances, the pressure from die part 41 may be sufficiently great that surface 15 be pushed inwardly, or downwardly as seen in FIG. 4, making the electrical connection unreliable because the surface 15 would no longer be parallel to the surface of the unitized assembly. Proper selection of the material thickness of tubular member 27 is important in this regard as well as of the material of the tubular members. It has been found, however, that by providing deformed segment 54 completely around tubular member 27, a predictable deformation is provided and still maintains electrical contacting surface 15 parallel to the surface of the unitized assembly. In making deformed segment 54, there are provided two radially extending portions 55 and 56 which permit tubular member 27 to flex and move along its axis. An important feature here is that there be at least one radially extending portion which frees the upper portion of tubular member 27 to move downwardly with respect to the anodized base plate 20. While making deformed segment 54, the thickness of the metal in deformed segment 54 may be somewhat less than in the remainder of the tubular member. Such reduced strength has been found not to be a substantial factor in determining where deformation takes place although by stretching the metal to a high degree the reduced strength could be made a substantial factor in predetermining deformation. It should be noted that segment 54 may be either radially inwardly or outwardly extending with respect to the sidewall of tubular member 27.

Figure 5:
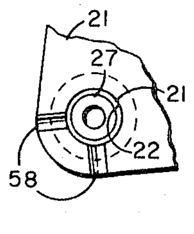
FIG. 5 is a diagrammatic view of one portion of a conductive base plate of the FIG. 3 illustrated assemblage showing mold runners.

After the movable die part 41 is closed, fluid plastic material is forced into mold cavity 45 and then cured or hardened in a known manner. This fluid plastic material under pressure exerts pressure on tubular member 27 tending to force it inwardly. To counteract this pressure and to provide an electrically insulating portion inside tubular member 27, mold runners 58 (FIGS. 3, 4, and 5) are formed on the underside of conductive base plate 21. It has been found that the addition of these mold runners facilitates the movement of plastic inside tubular members 25, 26, and 27. Permitting the plastic to enter the inside of the tubular members, also exerts an upward pressure on the radially extending portion of the tubular members forming the electrical connected surfaces 13, 14, and 15, such that there is an increased tendency to keep those surfaces parallel with surface 16.

As shown in FIG. 4, surface 15 would be parallel and aligned with the plastic encapsulating material along dotted line 46. As mentioned above, it may be desirable to have surface 15 above or below the plastic encapsulating material. To this end, a recess may be provided in movable die part 41 for receiving surface 15 such that it may extend above the plastic encapsulating material or an annular shoulder be provided to depress the surface below line 46.

Pressure exerted by movable die part 41 on surface 15, and thereby the pressure exerted on surface 16 by the upwardly facing surface 49 of stationary die part 40, has a magnitude at least equal to or greater than that of the pressure applied to the plastic in mold cavity 45. This excess pressure is desirable to keep the surfaces 13, 14, 15, and 16 free from encrochment of the then fluid plastic encapsulating material. To ensure no encroachment on surface 16, the three tubular members 25, 26, and 27 are spaced apart as shown along the periphery of base plate 20 such that the pressure exerted thereon by movable die part 41 is evenly distributed over surface 16. Under the pressures in a plastic encapsulating mold, a supposedly rigid plate 20 can flex sufficient to permit encroachment of plastic encapsulating material along the surface. As best seen in FIG. 3, plate 20 has a portion extending outwardly from between tubular members 25 and 27. Such an extending portion is subject to flexure, yet it is desired to prevent plastic encapsulating material from entering over surface 16 in the extending portion. To this end, deformed portion 38 of plate 20 is used to make the extending portion of plate 20 more rigid, thereby preventing flexure under molding pressure.

Figure 6:
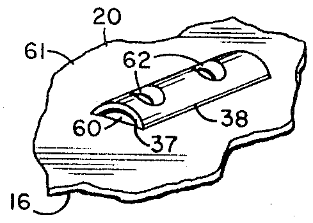
FIG. 6 illustrates a rigidizing and plastic locking portion of the anodized base plate shown in FIG. 3.

As best seen in FIG. 6, portion 38 is punched from base plate 20 to form an arcuate portion integral with the base plate 20 having an end 37 with an aperture 60 between the upper surface 61 of plate 20 and the arcuate portion. To ensure good plastic flow from above plate 20 to underneath portion 38 for forming the plastic rectangle 17 (FIG. 2), a pair of apertures 62 are formed in portion 38. Such plastic flow through apertures 62 solidly locks the plastic encapsulating material onto plate 20 in the portion extending from between tubular members 25 and 27.

As best seen in FIG. 2, the plastic encapsulating material 11 extends only for a short distance around the edges of plate 20. Such a narrow width of plastic encapsulating material, together with a smooth edge around plate 20, does not provide positive locking of the plastic encapsulating material onto the electrical assemblies. Upstanding flanges 34 and 35, as well as the three tubular members 25, 26, and 27, provide additional locking between the electronic assemblage and plastic encapsulating material 11.

I claim:

1. A unitized electronic assembly having oppositely facing major surfaces each with large rigid plate-like portions contiguous with plastic encapsulating portions,
the improvement including in combination,
a tubular metal member disposed between said portions and having a first end portion, a second end portion, and a mid-portion with a peripherally extending deformed segment and at least somewhat parallel with said major surfaces and said segment being collapsed to determine the spacing between said portions,
one of the rigid plate-like portions being affixed to said first end portion,
a second of the large plate-like portions being affixed to said second end portion,
electrical circuit means having components disposed adjacent said member and having an electrical connection thereto,
one of said rigid plate-like portions substantially constituting the corresponding major surface, and molded plastic encapsulating material between said plate-like portions and rigidly holding both plate-like portions in a predetermined relation to each other and forming the remainder of said major surfaces.

2. The subject matter of claim 1 wherein said segment consists of a radially-outwardly extending grooved portion extending continuously around the tubular member.

3. The subject matter of claim 2 wherein said tubular member has a circular configuration.

4. The subject matter of claim 2 wherein plastic encapsulating material is inside and outside each of the tubular members with an aperture extending through the assembly coaxially with each of the tubular members.

5. The subject matter of claim 4 wherein said base plate has means for providing plastic communication between inside said tubular members and outside said tubular members but within said electrical circuit means components.

6. The subject matter of claim 2 wherein there are a plurality of said tubular members spaced along the periphery of the unitized assembly and wherein the tubular members are mounted on a common metal base plate, said plate being one of said plate-like portions.

7. The subject matter of claim 6 wherein said base plate has a portion extending from between two of said tubular members and further including rigidizing means in said extending portion for preventing flexure thereof and for locking said plastic encapsulating material and said base plate together.

8. The subject matter of claim 6 wherein said second plate-like portion comprises an anodized metal base plate,
a conductive base plate disposed on said anodized metal base plate inwardly thereof, the tubular members being on said conductive base plate and one of said tubular members being in electrical connection with the conductive base plate,
said conductive base plate and said anodized base plate being in good thermal conductive relationship one with the other and said conductive base plate covering only that portion of the anodized base plate intermediate said tubular members.

9. The subject matter of claim 8 further including a lead frame, an insulating layer on said conductive base plate and supporting said lead frame in electrical insulating relationship to said conductive base plate,
a plurality of semiconductor dice, at least one of which is on said lead frame and one of which is supported on said conductive base plate,
said tubular members being metallic and respectively forming the electrical connections to portions of said lead frame and said conductive base plate, and
further electrical connections exterior to said plastic encapsulating material in electrical connection with said lead frame.

10. The subject matter of claim 9 further including mica washers disposed intermediate two of said tubular members and said conductive base plate electrically insulating said two tubular members from said conductive base plate.

11. The subject matter of claim 8 wherein said rigidizing means consists of a truncated cylindrical integral portion of said anodized base plate and has an aperture therein for permitting fluid plastic encapsulating material to flow through.

12. A molded plastic encapsulated assembly having first and second oppositely facing major surfaces,
the improvement including in combination,
a thermally-conductive plate means substantially forming all of the first major surface and having plastic material locking means,
electrically conductive plate-shaped means forming a portion of the second major surface,
a partially-collapsed upstanding metal means rigidly connected to said plate-shaped means and disposed on said thermally-conductive plate means and having an original upstanding length greater than the spacing between said plate-shaped means and said thermally-conductive plate means and having a portion extending parallel to said thermally-conductive plate means and having a deformed segment extending parallel to said thermally-conductive plate means,
electrical circuit means disposed on said thermally-conductive plate means and having an electrical connection to said plate-shaped means, molded plastic encapsulating material surrounding said metal means and forming the major surfaces of said assembly except for the portions formed by the first two-mentioned means and intimately formed in said plastic-material locking means and covering said portion extending parallel to said thermally-conductive means such that said plastic encapsulating material rigidly holds said plate-shaped means and said thermally-conductive plate means in a fixed relation, and said partially-collapsed upstanding metal means extending in a plurality of directions all parallel to said thermally-conductive plate means with a compressive strength greater along its upstanding direction than in said deformed segment.

References Cited

UNITED STATES PATENTS 3,325,586 7/1967 Suddick.

DARRELL L. CLAY, *Primary Examiner.*

U.S. Cl. X.R.

29—627; 174—68.5; 264—272; 317—100, 101, 234